United States Patent

Gatzke et al.

[11] 3,915,771
[45] Oct. 28, 1975

[54] PAVEMENT-MARKING TAPE

[75] Inventors: Kenneth G. Gatzke; Jane E. Raymond, both of St. Paul, Minn.

[73] Assignee: Minnesota Mining and Manufacturing Company, St. Paul, Minn.

[22] Filed: Mar. 4, 1974

[21] Appl. No.: 447,957

[52] U.S. Cl. ............... 156/71; 404/72; 404/94; 427/163; 428/325
[51] Int. Cl.² ............................. E01C 23/16
[58] Field of Search ......... 161/DIG. 5, 162; 156/71; 404/72, 94; 117/35 R, 37 R

[56] References Cited
UNITED STATES PATENTS

| | | | |
|---|---|---|---|
| 2,354,018 | 7/1944 | Heltzer et al. | 117/33 |
| 3,222,204 | 12/1965 | Weber et al. | 117/27 |
| 3,314,838 | 4/1965 | Erwin | 161/119 |
| 3,574,043 | 4/1971 | Luber et al. | 161/160 |

Primary Examiner—Edward G. Whitby
Attorney, Agent, or Firm—Alexander, Sell, Steldt & Delahunt

[57] ABSTRACT

A decomposable, paper-backed, retroreflective, pavement-marking tape for use in providing removable pavement markings.

6 Claims, 1 Drawing Figure

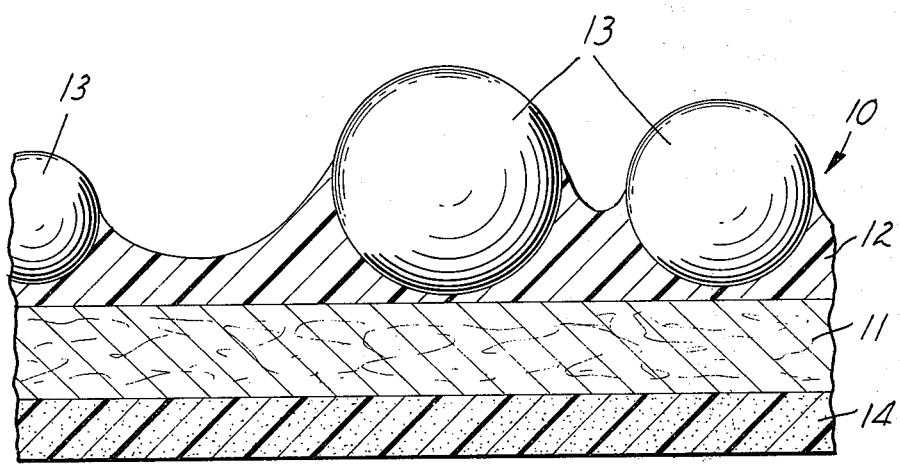

PAVEMENT-MARKING TAPE

BACKGROUND OF THE INVENTION

There is a need for pavement markings that can be readily removed after the reason for using the markings ends. A primary occasion for such markings is at construction sites where, for a limited period of time, traffic-control markings diverting traffic to a temporary route are needed. Other occasions for temporary pavement markings are for marking of temporary parking spaces and for so-called "asphalt-overlay" work, in which a base substrate of asphalt is temporarily marked prior to application of a finishing layer of asphalt, and when temporary markings are applied as a guide for subsequent application of painted markings.

While intended to be temporary, the markings still must be effective and useful during their life. Desirably the markings have retroreflective properties that will be maintained during their period of use.

Present-day pavement markings, which are normally made with a paint or other coating composition or by adhering a preformed tape to the paved surface, do not offer the desired combination of properties. A primary deficiency of paint markings is that they are difficult to remove. Attempts are made to remove them, as by abrading them or painting over them, but those methods are costly and do not always give satisfactory results. Most often the paint markings are left to wear away by normal attrition over a rather long period of time. As to the previously suggested preformed tapes, which generally use a metal-foil or plastic-film backing, while such tapes may be removed by breaking the bond between them and the paved surface, it is often difficult to easily remove them in one piece, and once removed they must be handled and disposed of.

SUMMARY OF THE INVENTION

The present invention provides a tape by which easily removed markings may be made on pavement. Briefly, a pavement-marking tape of the invention, which is generally less than 12 inches in width and is supplied while wound in roll form, comprises a crepe-paper water-resistant backing that is impregnated with a polymeric binder material and that carries on one side a bonding layer of polymeric material; a monolayer of randomly scattered transparent microspheres that are between about 100 and 1,000 micrometers in average diameter and are each partially embedded in, and partially exposed above, the bonding layer; and a layer of pressure-sensitive adhesive material carried on the side of the paper backing opposite from the side that carries the microspheres.

A pavement-marking tape as described above does not need to be lifted off the roadway to remove it as a traffic-control marking, but instead can be caused to decompose. (Or, if the tape is left in place, the tape will eventually decompose by normal wear.) Typically, decomposition is initiated by heating the tape to a high temperature as with a flame. The high temperatures degrade the bonding layer of polymeric material in which the monolayer of glass microspheres are partially embedded, as by charring or even burning. During this process the bond between the microspheres and the polymeric material is weakened so that the microspheres become loose or easily removable. Further the bonding layer of polymeric material and the paper backing become susceptible to rapid wear by traffic passing over the markings.

Prior to steps initiating decomposition of a tape of the invention after it has been in place for a desired temporary period of time, the tape is an effective traffic-control marking. But within a short while after initiating decomposition, the tape has become at least substantially removed so as not to be confusing to traffic. And the removal has been achieved simply and at relatively low cost.

ANCILLARY PRIOR ART

Retroreflective sheeting using a paper backing was taught long ago; see, for example, U.S. Pat. No. 2,354,018. However insofar as known, it has never been suggested that paperbacked retroreflective tapes would satisfy the need for removable pavement markings. The pavement-marking tapes of the invention are structurally unique over previously suggested paper-backed retroreflective sheeting in ways that adapt the tapes to use as pavement markings. And nothing in the known prior art would suggest modifying the previous paper-backed retroreflective sheeting for use as a pavement-marking tape.

DETAILED DESCRIPTION

The drawing is a greatly enlarged cross-section through an illustrative pavement-marking tape of the invention 10. This pavement-marking tape comprises a crepe-paper backing 11, a bonding layer 12 of heat-degradable polymeric material coated on one side of the paper backing, a monolayer of transparent microspheres 13 partially embedded in the bonding layer of polymeric material and partially exposed above the bonding layer, and layer of pressure-sensitive adhesive 14 coated on the side of the paper backing opposite from the side that carries the microspheres.

By "crepe paper" it is meant a paper that is made, as by crowding the wet sheet of paper stock on a roll, so that the paper has a degree of stretchability without rupturing. The fibers in the paper may be natural or synthetic. For most purposes the crepe paper useful in pavement-marking tape of the invention may be stretched at least 5 percent (that is, elongated to 105 percent of its original length) without rupture. Preferably, the paper may be stretched about 10 percent without rupture. The paper backing is generally between about 3 and 10 mils in thickness, though thinner backings may be desirable for some purposes. Because the paper backing is a stretchable crepe paper, a tape of the invention may be more readily conformed to a paved surface and may be applied to form a curved mark.

The paper backing 11 should be water resistant; and that can readily be achieved by inclusion in the paper of an elastic polymeric binder material such as natural rubber, neoprene rubber, or vinyl chloride-based polymers such as copolymers of vinyl chloride and vinyl acetate. The polymeric binder material may be included in the paper backing by coating it on individual fibers prior to formation of the paper, or it may be impregnated into a previously formed paper. (Whatever the procedure of inclusion, a paper backing that includes polymeric binder material is described herein as "impregnated" with polymeric binder material.) The polymeric binder material should be impregnated throughout the paper backing to obtain long life in the paper backing. If the polymeric binder material does not extend throughout the backing, traffic crossing a tape of the invention may tear fibers in the area free of binder material so as to loosen part of the tape from the roadway. The impregnated polymeric binder material may be in two layers, as when polymeric material is deposited on different sides of the paper backing and allowed to soak into the backing.

The bonding layer 12 of polymeric material may be the same polymeric material as impregnated in the paper backing. The polymeric material in the bonding layer is heatdegradable, by which it is meant that high temperatures (such as those produced by a propane-air flame) will cause the polymeric material to degrade, as by charring or burning. The polymeric material is generally pigmented, either with opacifying or transparent pigments or dyes. White and yellow are the most common colors, but other colors may also be used. The thickness of the bonding layer varies with the desired useful life of the tape and with the size of the microspheres to be partially embedded in the bonding layer. For pavement marking tapes intended to be used a short period of time, the bonding layer of polymeric material is rather thin, generally having an average thickness between about 2 and 5 mils. Generally the bonding layer of polymeric material will not exceed about 10 mils in thickness.

The polymeric material of the bonding layer is generally applied to the paper backing in solution, and following that application, transparent microspheres are cascaded onto the wet thickness of the coated polymeric material by known procedures. Thereupon the microspheres become partially embedded in, and partially exposed above, the bonding layer as generally shown in the drawing (microspheres are regarded as partially exposed even if a thin layer of polymeric material from the bonding layer covers their protruding surface). The microspheres are preferably embedded to between about 40 and 60 percent of their diameter. The microspheres in pavement marking tapes of the invention are generally randomly scattered, meaning that there are less microspheres present than would be present in a densely packed monolayer of microspheres, such as is included in retroreflective sheeting to be used in traffic signs or the like. As a general rule, the number of microspheres per unit area of pavement marking tape of the invention is between about 50 and 75 percent of the number of the same microspheres as would be needed to form a densely packed monolayer (in which the microspheres are essentially in tangential contact with one another).

The microspheres are generally between about 100 and 1,000 micrometers in average diameter and preferably are between 150 and 850 micrometers in average diameter. The microspheres generally have an index of refraction that is about 1.5 and 2.0, whereupon they are retroreflective when dry. They may also have a higher index of refraction, optimally 2.5 – 2.7, whereupon they are retroreflective when wet; and mixtures of microspheres of different indexes of refraction may also be used. Although the microspheres are most often made of glass, they may also be made of an organic polymeric material, to obtain particular colored effects, for example.

The layer of pressure-sensitive adhesive 14 is applied by conventional procedures, generally by applying the pressure-sensitive adhesive material in solution onto the paper backing. The preferred pressure-sensitive adhesive materials are rubber-resin type pressure-sensitive adhesive materials, but other materials such as acrylate-based polymers (see U.S. Pat. No. Re. 24,096) may also be used. The dry layer of pressure-sensitive adhesive material is usually between about 2 and 10 mils in thickness so as to provide good adhesion to the roadway.

The invention will be further illustrated with the following example:

A coating solution is prepared from the following ingredients:

|  | Parts by weight |
|---|---|
| Two copolymers of vinyl chloride and vinyl acetate (comprising about 87 weight-percent vinyl chloride and 13 weight-percent vinyl acetate; made by Union Carbide) |  |
| "Vinylite" VMCH | 11 |
| "Vinylite" VYHH | 11 |
| Liquid organo-tin-sulfur stabilizer (Advastab TM-180 from Carlisle Chemical Works) | 0.6 |
| Pigment Paste | 23.1 |
| Xylene | 15.5 |
| Methyl isobutyl ketone | 3.9 |
| Isophorone | 3.9 |
| Methyl ethyl ketone | 31 |

The pigment paste included in the above formulation is prepared by mixing the following ingredients:

|  | Parts by weight |
|---|---|
| Lead chromate | 57.0 |
| Dioctyl phthalate | 9.5 |
| Linear polyester plasticizer made from long-chain polybasic acid and polyhydric alcohol including glycerol and ethylene glycol ("Paraplex G40" from Rohm and Haas) | 28.5 |
| Xylene | 5.0 |

This solution is then coated onto a 5-mil-thick, low-density or saturating, cellulosic crepe paper capable of 7.5-percent stretch without rupturing. A two-roll coater is used with a smoothing bar set 12 mils above the paper.

The coated web is then passed under a dispensing head which cascades onto the coating glass microspheres that have diameters between about 180 and 425 micrometers and have been treated with fluorocarbon in the manner described in U.S. Pat. No. 3,222,204. Thereupon the microspheres become partially embedded in the coating. The coated web is then passed for eight minutes through ovens having temperatures that gradually increase to 300°F.

It is found that a major thickness of the crepe paper becomes impregnated with the coating solution. To fully impregnate the backing with polymeric material, the uncoated or back side of the paper is coated, using a knurl coater, with a 4-mil-wet thickness of dilute solution of a rubber-resin adhesive material of the type described in Example 5 of U.S. Pat. No. 3,451,537. Over this thickness is then coated with a two-roll coater a 9-mil wet thickness of an undiluted (30 weight-percent-solids) solution of the same pressure-sensitive adhesive material. The coated web is then passed for 5 minutes through three ovens having temperatures increasing to 150°F, following which the product is wound in a roll and slit to a desired width.

What is claimed is:

1. A decomposable pavement-marking tape that is less than about 12 inches in width and is wound in roll form, comprising a crepe-paper water-resistant backing that is impregnated with polymeric binder material and that carries on one side a bonding layer of heat-degradable polymeric material; a monolayer of randomly scattered transparent microspheres that are between about 100 and 1,000 micrometers in average diameter and are partially embedded in, and partially exposed above, the bonding layer of polymeric material; and a layer of pressure-sensitive adhesive material carried on the side of the paper backing opposite from the monolayer of microspheres.

2. A pavement-marking tape of claim 1 in which the bonding layer of polymeric material is pigmented white or yellow.

3. A pavement-marking tape of claim 1 that is at least about two inches wide.

4. A pavement-marking tape of claim 1 in which the polymeric binder material impregnated in the paper backing is the same as the polymeric material of the bonding layer.

5. A pavement-marking tape of claim 1 in which the polymeric binder material impregnated in the paper backing is different from the polymeric material of the bonding layer.

6. A method for forming temporary traffic-control markings on paved surfaces comprising:
   1. laying onto a paved surface a decomposable pavement-marking tape that comprises a crepe-paper water-resistant backing that is impregnated with polymeric binder material and that carries on one side a layer of heat-degradable polymeric binder material; a monolayer of randomly scattered transparent microspheres that are between about 100 and 1,000 micrometers in average diameter and are partially embedded in, and partially exposed above, the bonding layer of polymeric material; and a layer of pressure-sensitive adhesive material carried on the side of the paper backing opposite from the monolayer of microspheres; the tape being laid onto the paved surface with the pressure-sensitive adhesive layer against the paved surface; and
   2. pressing the tape against the paved surface to adhere the tape in place on the paved surface.

* * * * *